United States Patent
Johnson

[11] Patent Number: 5,911,193
[45] Date of Patent: Jun. 15, 1999

[54] CONFORMABLE INSULATING PAD FOR USE BY A CANINE

[76] Inventor: Todd L. Johnson, 19858 Jaguar Ave., Lakeville, Minn. 55044

[21] Appl. No.: 08/893,318

[22] Filed: Jul. 16, 1997

[51] Int. Cl.[6] .......................... A01K 29/00; A01K 1/015
[52] U.S. Cl. ........................... 119/28.5; 119/526; 4/583; 5/502; 428/137
[58] Field of Search ................... 119/28.5, 526; 5/420, 502; 4/581, 582, 583; 114/229; 296/97.23; 15/215, 216, 217, 160, 161; 428/137

[56] References Cited

U.S. PATENT DOCUMENTS

| | | |
|---|---|---|
| 4,028,750 | 6/1977 | Gustafsson ........................ 428/137 X |
| 4,137,575 | 2/1979 | Klaffke et al. .................... 428/137 X |
| 4,512,044 | 4/1985 | Clark ................................ 4/581 |
| 5,066,531 | 11/1991 | Legg et al. ....................... 428/131 |
| 5,675,855 | 10/1997 | Culp ................................. 5/709 |
| 5,735,004 | 4/1998 | Wooten et al. .................... 5/502 |
| 5,742,955 | 4/1998 | Parkay et al. ..................... 4/583 |
| 5,781,941 | 7/1998 | Radke et al. ...................... 4/583 |
| 5,806,909 | 9/1998 | Wise ................................. 296/39.1 |
| 5,811,167 | 9/1998 | Norvell ............................. 428/76 |

*Primary Examiner*—Michael J. Carone
*Assistant Examiner*—James S. Bergin
*Attorney, Agent, or Firm*—Merchant, Gould, Smith, Edell, Welter & Schmidt, P.A.

[57] ABSTRACT

The present invention is directed to a method and apparatus for protecting a dog from the cold. In one implementation of the present invention, the invention is directed to a flexible pad for protecting a dog from a cold boat hull. The flexible pad is formed of an elastic material, having a first side, a second side, and at least one drainage hole.

6 Claims, 6 Drawing Sheets

CONFORMABLE INSULATING PAD FOR USE BY A CANINE

FIELD OF THE INVENTION

The present invention is directed to an insulating pad for use by a hunting dog during outdoor conditions. Specifically, the present invention is directed to a low weight conformable pad for use in a boat or hunting blind to provide thermal insulation for a dog.

BACKGROUND OF THE INVENTION

Waterfowl hunting is a long-standing activity of outdoor enthusiasts around the world. Geese, ducks, and other waterfowl have been hunted for centuries as both a source of food and as a sporting activity. Today, in most parts of the United States, hunting is closely regulated and restricted to a few weeks or weekends during the autumn months.

Hunters often bring along dogs as retrievers when hunting ducks and geese. Popular breeds, such as Labrador Retrievers, Golden Retrievers, and Springer Spaniels are trained to retrieve downed birds from the water and return them to the hunters. During a typical day, a retrieving dog may enter and exit the water on numerous occasions to retrieve ducks and geese. Between retrieves, the dog stays in a duck blind or boat away from view of passing waterfowl.

In northern climates, such as Minnesota, Wisconsin, and Canada, the water temperature during the hunting season can approach the freezing point. While the dog's owner may try to dry the dog off after it returns from a retrieve, the cold water can cause the dog to become very chilled. In addition, some popular breeds of hunting dogs are commonly afflicted by arthritis in their hips, causing substantial discomfort when they get cold due to the tightening of muscles and joints.

The problems associated with cool weather hunting are often intensified by the fact that "duck boats" used in duck hunting are constructed of aluminum, which quickly conducts heat away from the dog's body. If a dog has no option except resting on the bottom of a metal boat, it will often get very chilled in a short amount of time.

Previously, hunters have used a variety of devices to protect dogs from the cold and from cold water. For example, life jackets or burlap sacks have been placed in the bottom of boats or blinds. However, both of these methods have significant shortcomings. Life jackets are too small to create a comfortable and even surface for a dog to sleep on, and they slide around easily in the bottom of the boat. Burlap sacks and similar cloth materials do not provide sufficient insulation to protect against the cold. Also, such sacks easily absorb water and can become very heavy during common hunting situations.

Another aspect of the enjoyment of waterfowl hunting is that ducks and geese are extremely alert and wary. Keen eyesight and a flock social structure combine to warn waterfowl of hunters. This wariness makes it imperative that hunters take every step possible to eliminate the risk of discovery. Therefore, any sort of pad or bed for a dog preferably is difficult for a waterfowl to observe.

Thus, there exists a need for a lightweight insulating device for retaining the heat of a wet dog while hunting which improves upon the prior art devices.

SUMMARY OF THE INVENTION

The present invention is directed to a method and apparatus for protecting a dog from the cold. In one implementation of the present invention, the invention is directed to a flexible pad for protecting a dog from a cold boat hull. The flexible pad is formed of an elastic material, having a first side, a second side, and at least one drainage hole.

The pad is positioned within a boat hull such that the pad substantially conforms to the side of the boat when a dog is sitting in the boat on the pad. In specific implementations, the flexible pad has a non-slip bottom surface that will not substantially slide within the hull of the boat when a dog is on the pad. The flexible pad further comprises a camouflage pattern integrally formed within the pad and extending from the first side to the second side of the pad in specific implementations of the present invention.

In certain embodiments of the present invention, drainage holes extend through the pad. The drainage holes also function as reservoirs for retaining water that has dripped off of the dog or has accumulated in the bottom of the boat, allowing the dog to stay elevated above the water when on the pad.

Figure 1:
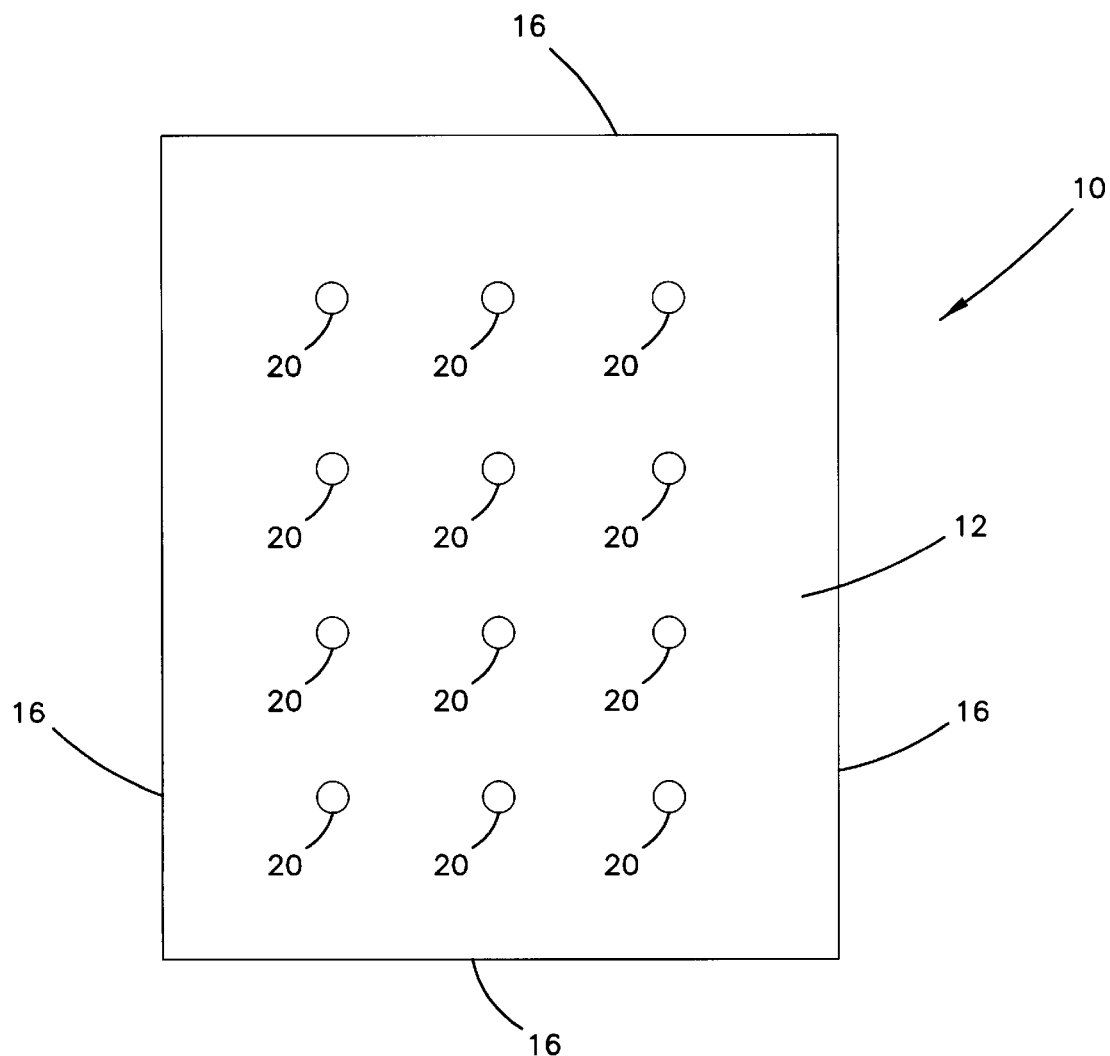
FIG. 1 is a top elevational view of a flexible pad constructed in accordance with the present invention.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION

The present invention is directed to a method and apparatus for protecting a dog from the cold. The present invention includes a conformable pad for use in a hunting blind or boat while hunting waterfowl. The pad is rolled for storage and transport, but is unrolled and placed within a blind or boat for a dog to rest on when not in the water, and remains flexible in freezing temperatures. The pad permits the dog to retain heat and allows the dog to stay above cold and wet surfaces.

Referring to the figures, FIG. 1 shows a flexible pad constructed in accordance with the present invention. The flexible pad, referred to generally as 10, includes a top surface 12, a bottom surface 14, and edges 16. A plurality of holes 20 extend from the top surface 12 to the bottom surface 14, and provide drainage.

Figure 2:
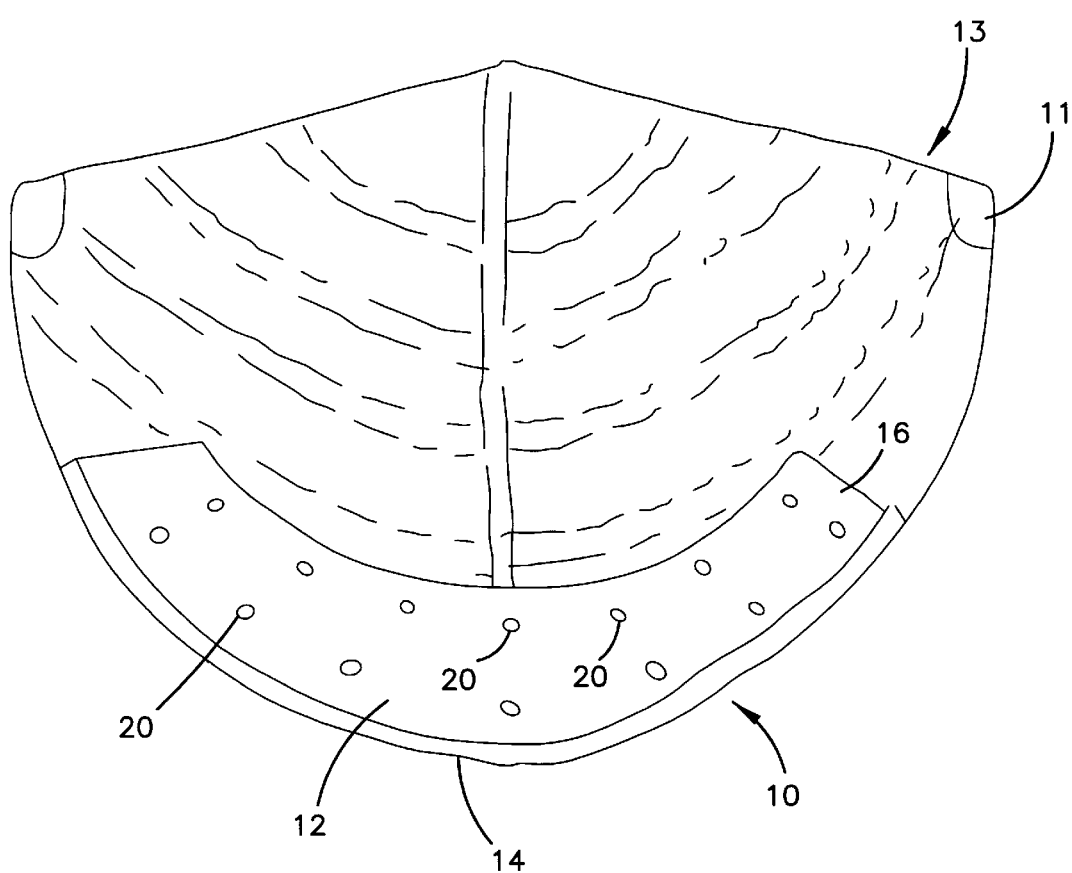
FIG. 2 is a top view of a flexible pad constructed in accordance with the present invention, showing the pad within a boat hull.
Figure 3:
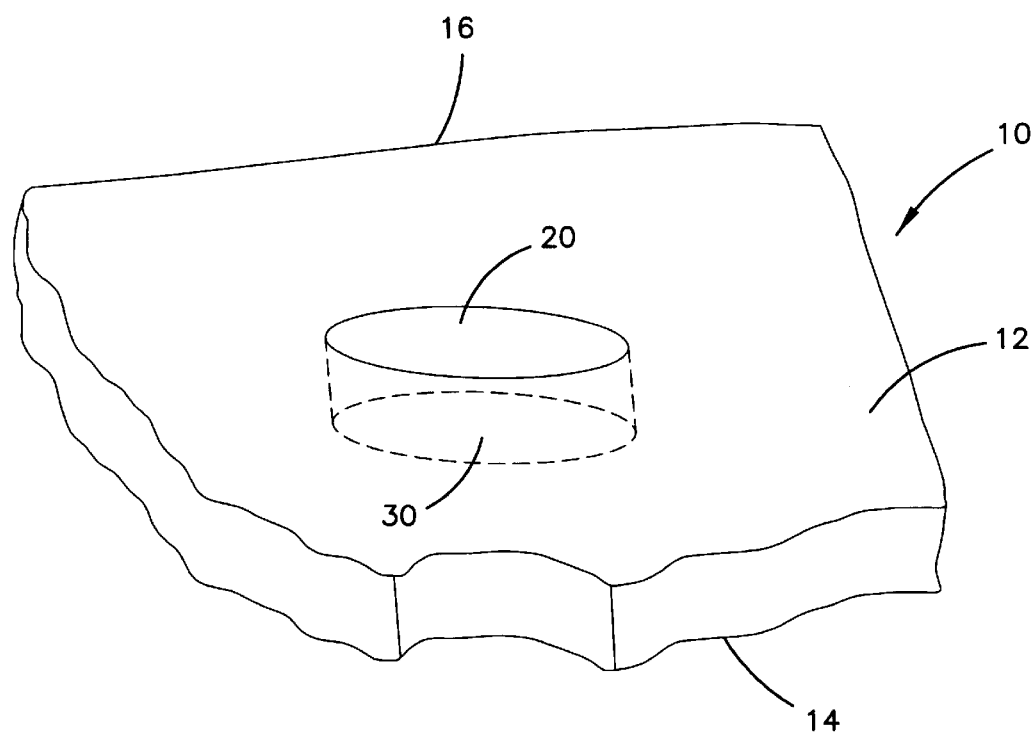
FIG. 3 is a fragmentary perspective view of the flexible pad shown in FIG. 2.
Figure 4:
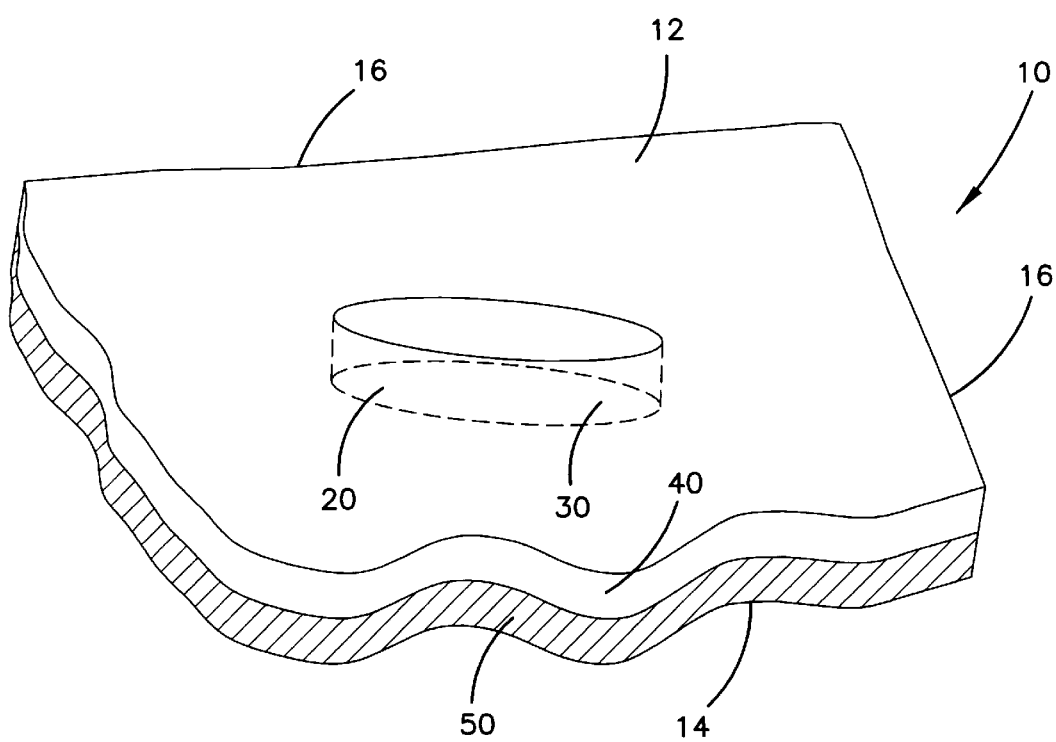
FIG. 4 is a fragmentary perspective view of a flexible pad constructed in accordance with the present invention, showing drainage holes and reservoirs.
Figure 5:
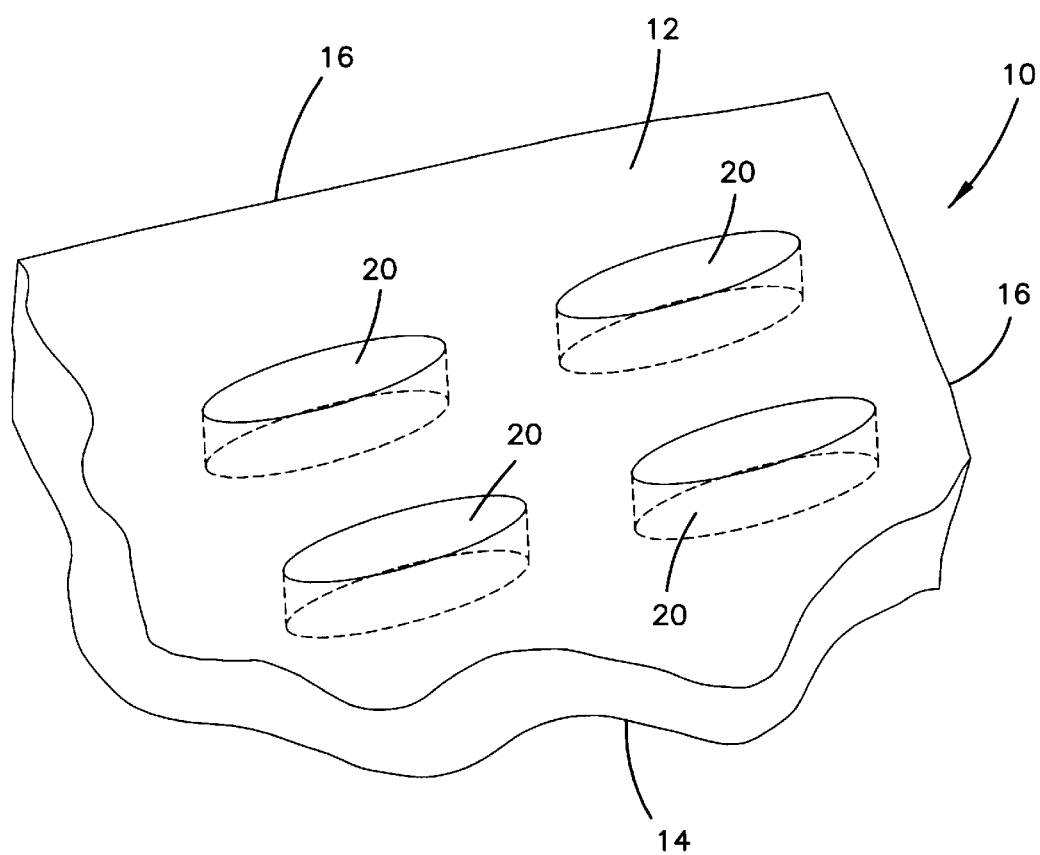
FIG. 5 is a fragmentary perspective view of a twin-layer flexible pad constructed in accordance with the present invention.

Referring to FIGS. 2 and 3, flexible pad 10 conforms to the side of the hull 13 of a boat 11. By conforming to the interior of the hull 13, the flexible pad 10 creates a supported surface upon which a dog may rest. In addition to supporting the dog, pad 10 reflects heat back to the dog, drains away water, and reduces conductive transfer from the dog to the hull or ground. The stable surface reduces movement and rocking of the boat 11 by eliminating unexpected weight shifts. In specific implementations, the flexible pad 10 is secured to the hull by hook and loop fasteners, such as those sold under the trademark Velcro®.

In a specific embodiment of the present invention, the flexible pad has a width of less than 36 inches, a length of less than 48 inches, and a thickness of 0.75 inch or less. In other implementations of the present invention, the flexible pad 10 has a width of 32 inches, a length of 40 inches, and a thickness of 0.75 inch. The pad is sized to comfortably fit a hunting dog when in a prone position, without being too large that the pad does not fit well within a boat or is too cumbersome to carry. The pad has preferred dimensions of a width of 29 inches, a length of 36 inches, and a thickness of 0.5 inch.

In specific implementations, the flexible pad 10 has a non-slip bottom surface 14 that will not substantially slide within the hull 13 of the boat 11 when a dog is on the pad.

In specific implementations of the present invention, the bottom surface 14 of the flexible pad 10 resists slipping when in contact with the hull 13 of the boat 11. By being supported from the bottom surface 14, and reducing slipping, the conforming flexible pad 10 avoids undesirable rocking and movement in the boat 11 when the pad 10 is repositioned or moves around.

The flexible pad 10 further comprises a camouflage pattern integrally formed within the pad 10 and extending from the top surface 12 to the bottom surface 14 of the pad 10 in specific implementations of the present invention. The camouflage pattern extends throughout the pad 10, and thus slight tears or abrasion do not diminish the camouflage effect by exposing a non-camouflage interior.

In specific implementations of the present invention, the pad 10 includes a plurality of drainage holes 20 extending through the pad 10. The drainage holes 20 form reservoirs 30 for retaining water that has dripped off of a dog or has accumulated in the bottom of a boat 11 or on the ground. Thus, the reservoirs 30 provide a place for water to collect and elevate a dog above the water that accumulates in the boat or blind.

In certain implementations of the present invention, flexible pad 10 is constructed of two separate layers. A top layer 40 and a bottom layer 50 are bonded to one another. Top layer 40 is constructed of an abrasion resistant material that resists tearing and damage from sharp objects, such as the claws of a dog's feet. In a preferred embodiment, top layer 40 includes a reflective property such that most infrared light is reflected back onto the dog. The reflective properties are accomplished by either adding a reflective coating to the top layer or are an integral property of the top layer.

In specific implementations of the present invention, the reflective layers are formed of a material that substantially reflects infrared light but does not reflect most visible light. Preferably, the majority of all infrared light is reflected. Some visible light is absorbed and some is reflected.

In specific implementations of the present invention, the pad 10 reflects substantially all or most infrared light, and absorbs most visible light except desired portions of the visible spectrum. For example, a pad 10 which will be used in a green environment is made with a reflective surface that reflects infrared light and visible green light, but absorbs most other light. The green light may be selectively reflected by different portions of the pad to create a broken pattern with a camouflage appearance. As such, heat is reflected back onto the dog and green light is reflected to waterfowl without creating a reflection readily visible from the air by flying waterfowl. Alternatively, for example, brown light, gray light, blue light, or combinations thereof, are selectively reflected along with infrared light.

Suitable materials for use in the top layer include, for example, Cordura, polypropylene, nylon and cotton duck cloth. The pad 10 is preferably formed of materials that do not substantially absorb water.

Top layer 40 is resistant to puncturing by the claws of a dog in specific implementations. In certain implementations, the top layer is able to withstand a force of greater than 10 pounds per square inch. In certain other implementations, the top layer is able to withstand forces of greater than 100 pounds per square inch. This puncture resistance not only prevents puncture by the dog's claws, but also reduces wear from twigs, rocks, etc. that come in contact with the pad.

Bottom layer 50 provides insulation and padding. In a preferred embodiment, bottom layer 50 is a foam material providing elastic cushioning for the dog as well as insulation from the conductive loss of heat. Bottom layer 50 may be constructed, for example of polyethylene, closed cell neoprene, or ansolite®. The bottom layer 50 is preferably constructed of a material that retains its elastic cushioning even when punctured or abraded. Thus, the bottom layer 50 may be punctured in one or more positions while retaining its elastic properties.

Figure 6:
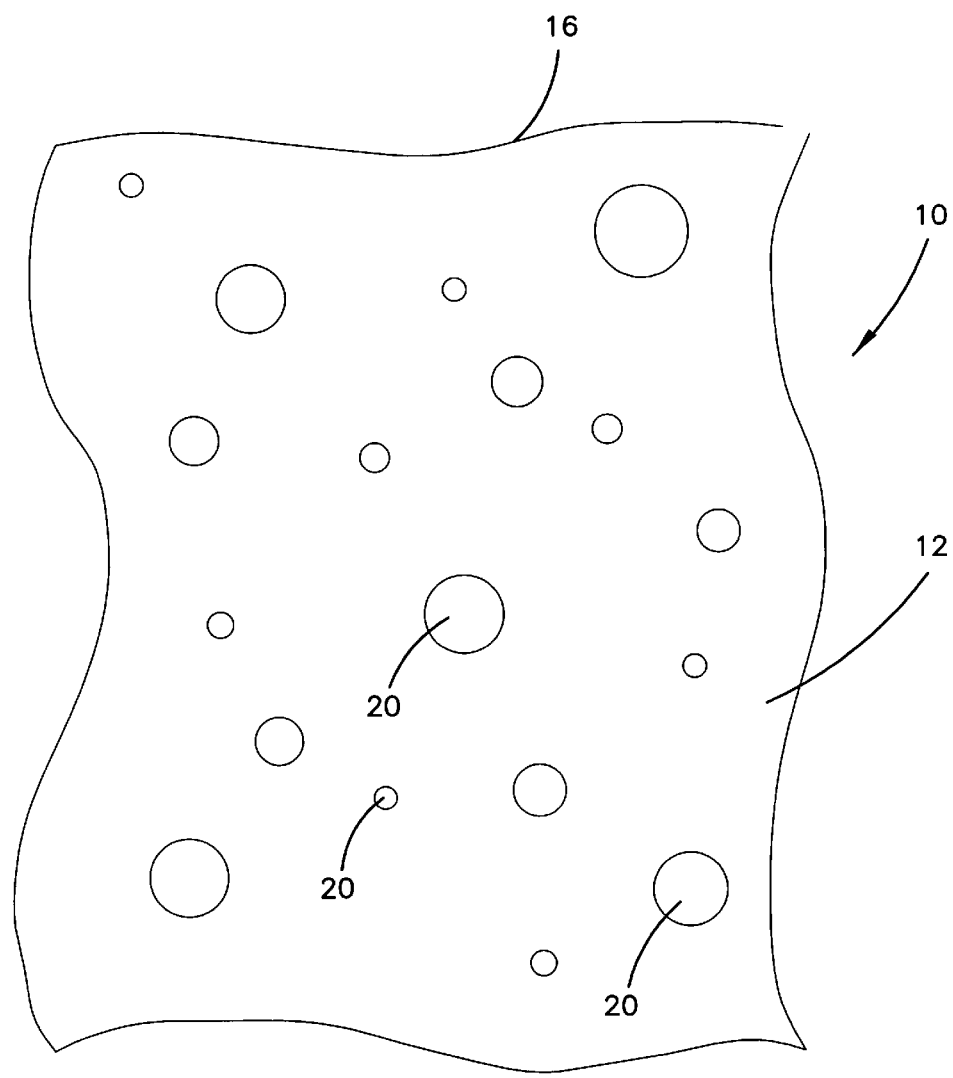
FIG. 6 is a top view of a flexible pad constructed in accordance with the present invention.

The holes 20 within the flexible pad 10 permit water to travel from the top surface 12 to the bottom surface 14 of the flexible pad 10. The holes 20 are preferably approximately 1" in diameter in order to avoid clogging by debris such as leaves or stones, while still preventing a dog's paws from becoming lodged within the hole. Alternatively, the holes 20 are from 0.1" to 2.0" in diameter. The holes 20 are preferably approximately equal in size, but in alternative embodiments may vary in size. Such variation in size may be used to enhance the camouflage effect of the pad 10, as shown in FIG. 6.

In specific implementations of the present invention, the flexible pad 10 is inserted within a flexible case or covering. The case is made of a flexible fabric or laminate, such as Cordura, polypropylene, nylon or cotton duck cloth. More than one flexible case may fit a single flexible pad 10, such that the camouflage pattern is variable. For example, a white case may be used for snow conditions, field patterns may be used for hunting on crop land, and a marsh grass pattern may be used on wetlands.

In specific implementations of the present invention, the holes 20 in the pad 10 are arranged in rows and columns as displayed in FIG. 1. In alternative embodiments, the holes are varied in size, in shape, or in orientation to improve the camouflage effect.

The flexible pad 10 is easily folded or rolled in order to be easily and efficiently carried to a hunting location. In addition, flexible pad 10 is very lightweight, preferably less than three pounds.

The number of holes 20 may be from zero up to hundreds. In preferred embodiments, the number of holes 20 is from 12 to 50. The holes 20 shown in FIG. 1 pierce the pad 10 from the top surface 12 to the bottom surface 14. However, in specific implementations, some or all of the holes 20 extend only part way through the pad 10.

The edges 16 of the pad 10 may be straight or curved in order to minimize visibility from above. As shown in FIG.

6, the outside edges 16 are formed of an irregular shape in order to enhance the camouflage effect of the pad 10. The holes 20 may also be of irregular shapes to enhance the camouflage effect.

The holes 20 are distributed evenly along the pad 10 in specific implementations. In other implementations, the holes are distributed with a greater density near the center of the pad 10 than near the edges in order to promote drainage when the pad 10 is placed within a boat or other concave form wherein the center of the pad 10 is lower than the edges of the pad 10.

It will be apparent to those skilled in the art that various modifications and variations can be made to the embodiments illustrated herein without departing from the scope or spirit of the invention. Such modifications and variations do not depart from the true scope and spirit of the invention which is set forth by the following claims.

What is claimed is:

1. A method of protecting a dog from a cold hull of a boat, the method comprising:

providing a flexible pad formed of an elastic material, the flexible pad having a first side, a second side, and a plurality of drainage holes piercing the pad from the first side to the second side, the holes having a diameter of between 1.0 and 2.0 inches;

the pad further comprising an upper layer and a bottom layer, the upper layer manufactured from a puncture resistant compound and the lower layer manufactured from a compressible elastic compound that retains its compressible elasticity even after being punctured;

the pad including an integral camouflage pattern extending through the top and bottom layers and providing a variable colored surface that significantly blends with natural vegetation;

the pad having a thickness of between 0.25 and 1.0 inches, a width of less than 32 inches, and a length of greater than 32 inches; and positioning the flexible pad within the hull of the boat such that the pad conforms to the side of the boat when a dog is sitting in the boat.

2. The method of protecting a dog from a cold hull of a boat according to claim 1, wherein the pad is made of a material selected from the group consisting of polyethlene, or closed cell neoprene.

3. The method of protecting a dog from a cold hull of a boat according to claim 1, wherein the flexible pad has a second side that will not slide within the hull of the boat when a dog is on the pad.

4. The method of protecting a dog from a cold hull of a boat according to claim 1, wherein the pad further comprises a reflective outer layer for reflecting infrared light and visible green light, but absorbs substantially all other light.

5. A method of protecting a dog from a cold hull of a boat, the method comprising:

providing a flexible pad formed of an elastic material, the flexible pad having a first side, a second side, and at least one drainage hole, wherein the flexible pad further comprises a substantially nonslip second side that will not slide within the hull of the boat when the dog is on the pad, a camouflage pattern integrally formed within the pad and extending from the first side to the second side of the pad, and a reflecting surface on the first side that reflects infrared light but selectively absorbs visible light; and positioning the flexible pad within the hull of a boat such that the pad conforms to the side of the boat when a dog is sitting in the boat.

6. A flexible pad for insulating a dog while hunting, the pad comprising:

a sheet constructed of an elastic material, the sheet having a top side, a bottom side, and at least one edge;

a plurality of holes extending from the top side to the bottom side, the holes having a diameter of between 1.0 and 2.0 inches; and an integral camouflage pattern extending through the top and bottom layers and providing a variable colored surface that significantly blends with natural vegetation;

wherein the pad has a thickness of about 0.5 inch, a width of less than 30 inches, and a length of 36 inches, and a reflecting outer surface that reflects infrared light and most visible green light, but absorbs substantially all other visible light.

* * * * *